US007703776B1

(12) United States Patent  (10) Patent No.: US 7,703,776 B1
Nugent  (45) Date of Patent: Apr. 27, 2010

(54) SHOPPING CART AND HAND TRUCK AND GOLF BAG CART AND GARDEN CART

(76) Inventor: Gordon Walker Nugent, 160 Rivergate Dr., Wilton, CT (US) 06897-3611

( * ) Notice: Subject to any disclaimer, the term of this patent is extended or adjusted under 35 U.S.C. 154(b) by 0 days.

(21) Appl. No.: 10/817,010

(22) Filed: Apr. 3, 2004

(51) Int. Cl.
*B62B 1/22* (2006.01)
(52) U.S. Cl. .................. 280/47.26; 280/47.18
(58) Field of Classification Search .............. 280/47.17, 280/47.18, 47.19, 47.2, 47.24, 47.26, 47.28, 280/63, 79.2, DIG. 6
See application file for complete search history.

(56) References Cited

U.S. PATENT DOCUMENTS

| | | | |
|---|---|---|---|
| 2,121,756 A | 6/1938 | Heckert | |
| 2,212,053 A | 8/1940 | Smith | |
| 2,835,503 A * | 5/1958 | Humphries et al. | 280/47.19 |
| 2,962,292 A | 11/1960 | Edmonston | |
| 3,118,553 A | 1/1964 | Rosenzweig | |
| RE25,616 E | 7/1964 | Stanley | |
| 4,047,724 A * | 9/1977 | Shaffer | 280/5.22 |
| 4,251,178 A | 2/1981 | Bourgraf | |
| 4,813,701 A | 3/1989 | Balland | |
| 5,160,154 A * | 11/1992 | Seydel et al. | 280/47.19 |
| 5,201,540 A * | 4/1993 | Wu | 280/646 |
| 5,464,104 A * | 11/1995 | McArthur | 211/133.3 |
| 5,595,395 A * | 1/1997 | Wilson | 280/47.26 |
| 5,765,857 A * | 6/1998 | Hsiao | 280/646 |
| 5,947,492 A * | 9/1999 | Hallberg, Jr. | 280/47.24 |
| 6,024,527 A | 2/2000 | Soriano | |
| 6,045,150 A | 4/2000 | Al-Toukhi | |
| 6,131,926 A * | 10/2000 | Harlan | 280/47.26 |
| 6,254,112 B1 * | 7/2001 | Clegg | 280/47.19 |
| 6,394,471 B1 * | 5/2002 | Watson | 280/47.19 |
| 6,540,242 B1 * | 4/2003 | Raichlen | 280/47.27 |
| 2002/0149176 A1 | 10/2002 | Miller | |
| 2004/0113381 A1 | 6/2004 | Bergia | |

FOREIGN PATENT DOCUMENTS

| | | |
|---|---|---|
| DE | 3611738 | 10/1987 |
| GR | 2264026 A | 1/2002 |
| JP | 2002234443 | 8/2002 |

OTHER PUBLICATIONS

Polsteins Super Shopping Cart photo and text description, printed out from CatalogCity.com reference to Polsteins.com internet website on Mar. 11, 2004.

(Continued)

*Primary Examiner*—Frank B Vanaman

(57) ABSTRACT

Tall, lightweight folding shopping cart (FIG. 1) provides high-level detachable basket (44U) for easy basket transfers down to checkout counter, car trunk and home counter or table. Basket-support ledges (43U and 43L) on cart enable transfer of basket weight by sliding leverage rather than by lifting. Additional container (44L) increases cart capacity and flexibility in use. With baskets removed, cart serves as an all-purpose vehicle, ready to carry a strapped-on golf bag, luggage (FIG. 6), garden materials, furniture and other household burdens. Its lightweight folding character encourages new uses where carts have rarely gone before. On a family camping trip, for example, it can carry a folded tent to the campsite, and later deliver an ice chest of drinks and a food basket to the beach. Wheels (36L and 36R) are mounted for quick detachment to increase the storage compactness of an unloaded cart.

4 Claims, 12 Drawing Sheets

OTHER PUBLICATIONS

Bag Boy Model C-5 golf cart perspective drawing and parts list, sold with this relatively widely-sold commercial product available in the U.S. market during 2003.

Shopping cart Model No. 059 shown on United Steel & Wire Company internet website Jul. 31, 2006 at http://www.unitedsteelandwire.com/Carts-Plastic.asp.

* cited by examiner

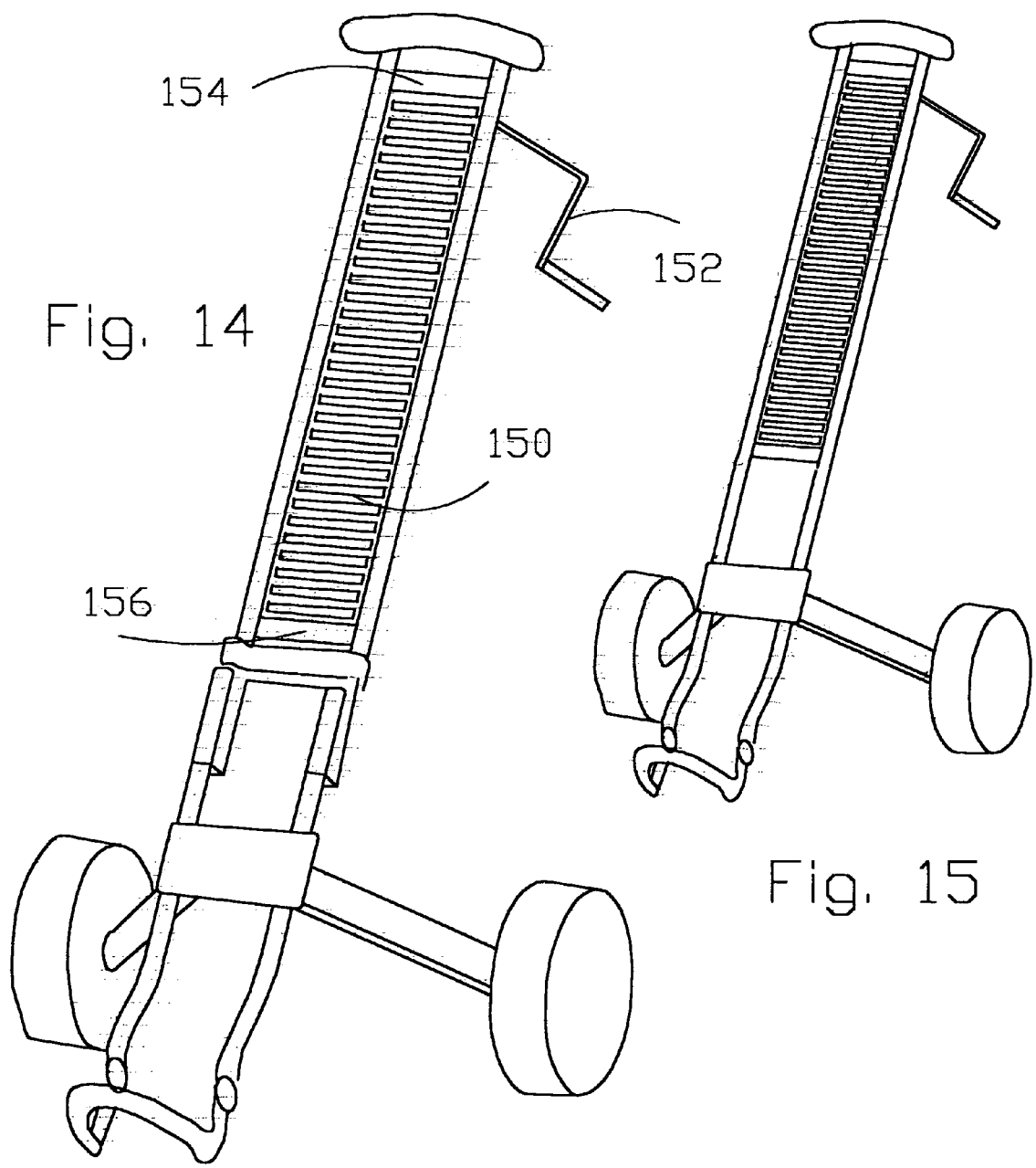

SHOPPING CART AND HAND TRUCK AND GOLF BAG CART AND GARDEN CART

FIELD OF THE INVENTION

This invention relates to shopping carts, specifically to those designed to carry a shopper's purchases from store shelf to checkout counter to car to home.

BACKGROUND OF THE INVENTION

Shopping carts are designed for storeowners, not shoppers. Storeowners choose carts to move maximum tonnage at minimum cost. They cleverly force shoppers into merchandise-handling labor cost-free to stores.

Shoppers' excessive labor starts with wresting a heavy steel cart from a nest. (Parking-lot cart jockeys ram ever-larger carts into ever-larger nests in ever-larger stores: grocery, hardware, drug, and department.) She or he then propels the cart on too-small wheels, sometimes fighting a jammed caster all through store and parking lot. The shopper must stoop to lower each choice from display shelf to a cart basket bottom below her knees. Steering and pushing grow harder as the basket grows heavier. She must stoop again to hoist each item to a checkout counter usually several inches above normal table height. She heaves and stoops again to lower everything back from checkout height to basket bottom. Wal-Mart, the nation's leading retailer and grocer, requires shoppers to perform additional work. Their cashiers drop purchases from high checkout counter to knee-level bag carousel, demanding an extra stoop and lift: over the cart's wall, before shopper can stoop again to return it to basket floor.

Next, unloading into his car trunk, a shopper stoops yet again to raise and lower each item. At home he stoops to lift purchases from the car trunk. Home may offer a carrier better suited for the next lap, such as a baby carriage, light wheelbarrow, garden cart, or child's wagon. Into such a carrier he lifts each item once again. Then his last lap: lifting it all up to his kitchen table or pantry counter.

Picture his labor during his six-lap transport of a gallon jug of milk, and every other purchase he makes:

1) shelf to cart
2) cart to checkout
3) checkout to cart
4) cart to car trunk
5) trunk to home carrier
6) carrier to kitchen counter Carts Consumers Can Buy Try to buy a cart more convenient and useful than store carts. There are plenty of folding wire-basket types on the-market today. A typical offering is the Polsteins Super Shopping Cart on the CatalogCity.com website in March, 2004. Four small wheels carry consumer purchases near the floor. Try garden carts, utility carts, small folding hand trucks, and luggage carts. All are designed to carry small loads near the floor, usually on small wheels.

Prior Art Attempts at Improvement

A small basket a shopper could carry home appears in U.S. Pat. No. 2,121,756 to Heckert (1938). Heckert, however, requires that both basket and cart remain in the store.

Detachable baskets appear in U.S. Pat. No. 4,813,701 to Balland (1989), with the usual deep single basket split into two or more shallow ones. But his complex lever systems and multiple sets of different-sized wheels may make his designs costly to fabricate and complex to use. Similar problems appear in the cart in U.S. Patent Application Publication 2002/0149176 A1 by Miller (2002).

A cart folding into the shopper's car trunk is offered in U.S. Pat. No. 6,045,150 to Al-Toukhi (2000). But his wheels are smaller than usual on store carts, and his shallow basket holds less merchandise. Similar small sizes appear in U.S. Pat. No. 3,118,553 to Rosenzweig (1964).

A crank-and-pulleys system elevates the shopping basket to car-trunk level in U.S. Pat. No. 6,024,527 to Soriano (2000). He suggests the cranking be done by an electric motor. Car-trunk loading of heavy business machines is done by overhead rail in U.S. Pat. No. 4,251,178 to Bourgraf et al (1981), but a 50-pound basket of groceries might have limited clearance beneath his rail.

U.K. Patent GB 2,364,026A to Kowssari (2002) spares the consumer the checkout-counter lifting work. The cart's capacity is smaller than average, and the store is required to rebuild its checkout counters. Another attempt at reducing checkout-counter labor appears in German Patent DE3611738 to Flier (1987). A vibrating slide returns merchandise to the side-wall-dropped cart. The cart's usual knee-level merchandise floor remains unimproved here.

The smallest of cart capacities found in our search appears in Japanese Patent JP2002234443 to Kitagawa (2002).

OBJECTS AND ADVANTAGES

To reduce shoppers' workloads by:

a) providing a table-height collection platform for heavier merchandise choices;

b) adding alternative merchandise containers for partial segregation of fragile and bulky lightweight items;

c) consolidating individual-item movements into basket movements;

d) easing all cart movements by providing lightweight construction, large wheels, a tight turning radius and soft-riding non-skid tires;

e) providing quick-attach and quick-detach basket locks, easy for a small woman to engage and release with baskets loaded;

f) easing cart movements by balancing loaded center of gravity near cart's virtual axle, g) using cart's long spine as lever for easy parking and easy lifting;

h) folding cart with a quick, simple movement into a compact package;

i) adding quick-detach wheel mounts for added storage compactness;

j) inviting alternative uses of the cart: carrying luggage, garden materials, golf clubs, and household miscellany;

k) making carts affordable by simple design and economical choice of high-volume standardized components, and l) padding any handles for comfortable grip.

Further objects and advantages will become apparent through the ensuing description and drawings.

SUMMARY

Lightweight folding shopping cart provides high-level detachable basket for easy transfers of purchases down to

DRAWINGS—FIGURES

FIG. 14 is a perspective view of a crank-driven elevator cart.

FIG. 15 is a perspective view of a fixed-length straight-spine cart.

Reference Numerals

| | |
|---|---|
| 33 | chassis |
| 34L | left lower spine rail |
| 34R | right lower spine rail |
| 35L | left leg |
| 35R | right leg |
| 36L | left wheel |
| 36R | right wheel |
| 37L | lower anchor block |
| 37U | upper anchor block |
| 38L | left upper spine rail |
| 38R | right upper spine rail |
| 39 | hinge pin |
| 40 | handle |
| 41L | left telescoping spine rail |
| 41R | right telescoping spine rail |
| 42L | left twist lock |
| 42R | right twist lock |
| 43L | lower folding ledge |
| 43U | upper folding ledge |
| 44L | lower basket |
| 44U | upper basket |
| 45L | lower sliding lock |
| 45U | upper sliding lock |
| 46L | lower hook |
| 46U | upper hook |
| 47 | toe loop |
| 49 | handle brace |
| 50U | upper mounting pin fixture |
| 50L | lower mounting pin fixture |
| 52U | upper telescope lock |
| 52L | lower telescope lock |
| 60 | top tower basket |
| 62 | support platform |
| 64 | second basket |
| 66 | third basket |
| 68 | alternate position |
| 70L | left bicycle wheel |
| 70R | right bicycle wheel |
| 80 | solid lower spine |
| 82 | solid upper spine |
| 84 | anchor hook |
| 86 | net bag |
| 90 | center wheel |
| 92 | locking axle-brace |
| 94L | left outrigger strut |
| 94R | night outrigger strut |
| 100U | upper tub |
| 100L | lower tub |
| 102 | quick-release belt |
| 110 | left forward telescope lock |
| 112 | right forward telescope lock |
| 114 | flexible cable |
| 116 | pyramid cap |
| 118 | left slanting block |
| 119 | right slanting block |
| 120 | top circular tray |
| 122 | middle circular tray |
| 124 | bottom circular tray |
| 126 | upper spine segment |
| 128 | hollow middle spine segment |
| 130 | hollow lower-spine segment |
| 132 | left partition |
| 134 | right partition |
| 140 | hinged left end panel |
| 141 | rear panel |
| 142 | balancing pocket |
| 150 | endless belt |
| 152 | crank |
| 154 | upper belt roller enclosure |
| 156 | lower belt roller enclosure |

DETAILED DESCRIPTION—FIG. 1—PREFERRED EMBODIMENT

Figure 1:
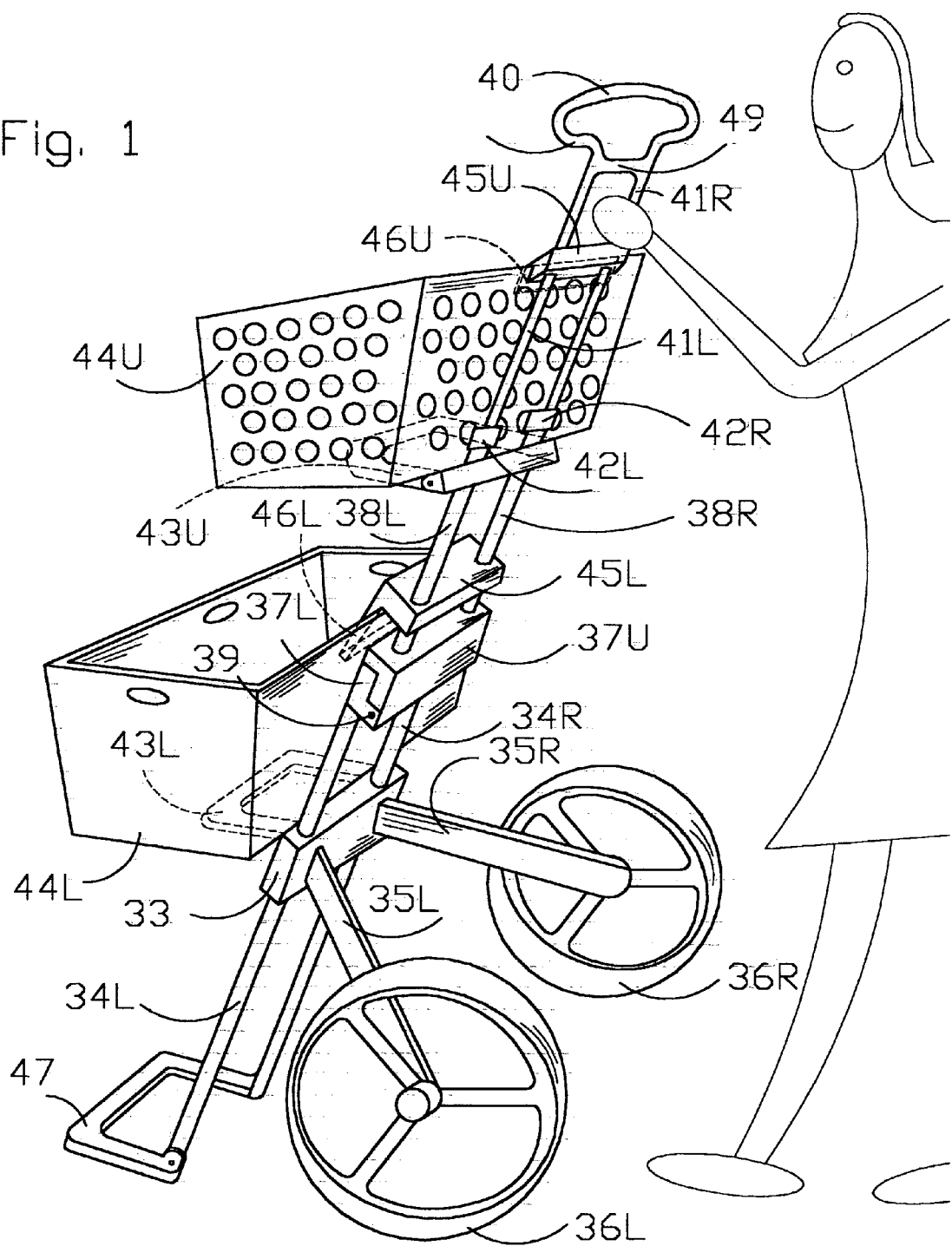
FIG. 1 is a perspective view of the preferred embodiment of my cart.

FIG. 1 shows a left-side perspective view of the preferred embodiment. Main anchor block, foundation or chassis 33 secures dual lower spine rails, tubes or frame posts 34L and 34R in parallel position, aided by lower anchor block 37L. Chassis 33 also provides anchorage for hinged folding struts, wheel stalks or legs 35L and 35R. Quick-release hub connectors, not shown, for wheels 36L and 36R are well known in the art, as is the strut-folding mechanism. Upper anchor block 37U secures upper spine rails 38L and 38R in parallel position, aided by handle 40 and handle brace 49.

Block 37U also contains a spring-loaded lock mechanism, well known in the art, releasing this block to pivot around hinge pin 39, allowing upper rails to fold down parallel to lower rails for compact storage. Handle 40 may be adjusted for height and resulting leverage by means of telescoping spine rails 41L and 41R, when twist locks 42L and 42R are opened. These locks also are well known in the art, hence not detailed here.

Folding platforms, ledges, or basket support shelves 43L and 43U hold cargo containers, boxes or baskets 44U and 44L, cooperating with sliding blocks or spade locks 45L and 45U. After a basket is placed on its shelf, its sliding lock is moved down the rails until the downward projection, hook or spade of the block front, 46L or 46U, moves down inside the basket wall, retaining it in place. Folding toe loop 47 can carry large or heavy items. Bottom corners of this loop act as skids and also, when the cart is parked, act as balancing support points. Perforations in basket 44U reduce weight, increase visual access to contents, and might be preferred for the lower basket also.

OPERATION OF PREFERRED EMBODIMENT

Figure 12:
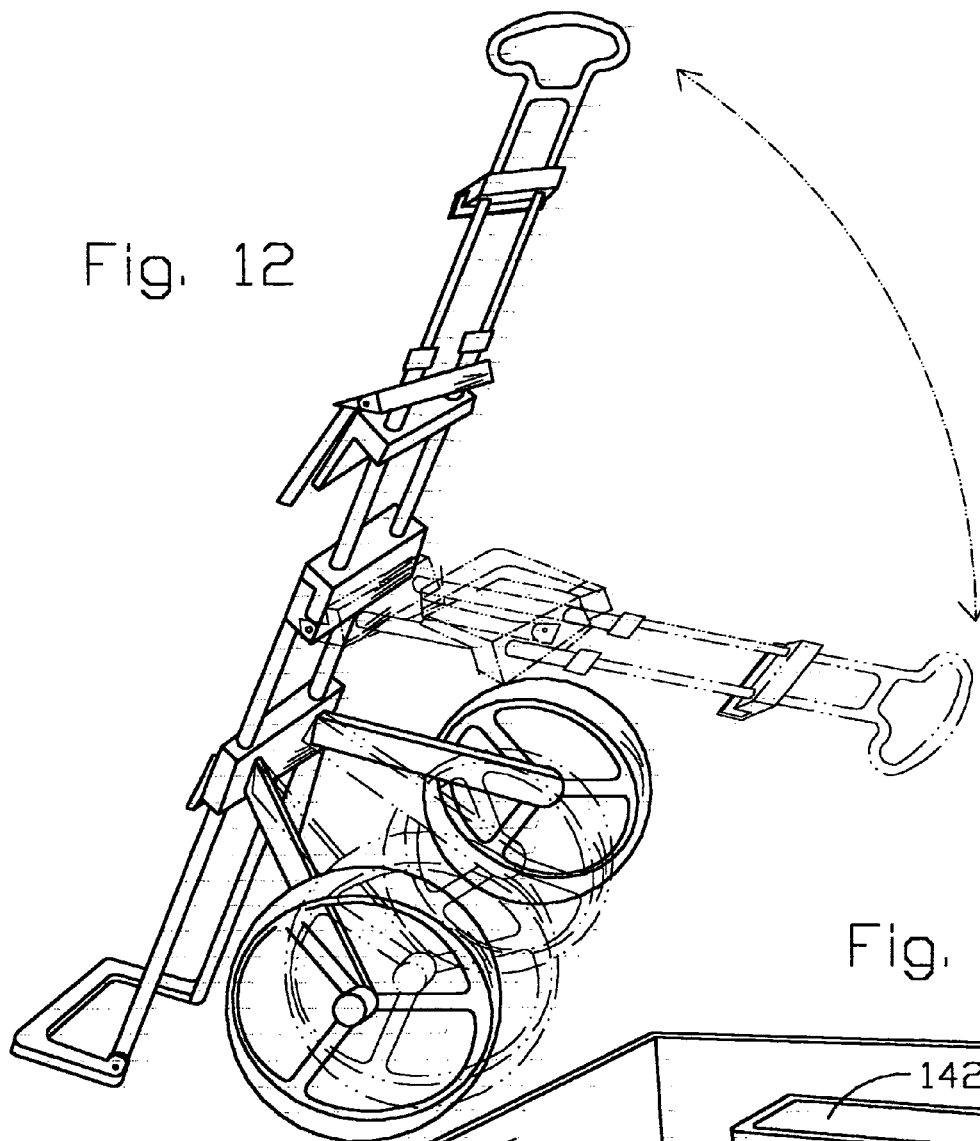
FIG. 12 is a perspective view of our preferred embodiment showing partially folded spine and wheel positions.

Shopper removes folded cart from car trunk. With an average or larger-size trunk, quick-dismount wheels 36L and 36R remain permanently mounted unless unusual conditions arise. Shopper places heel of toe loop 47 on the ground, holding cart frame by handle 40 and lower anchor block 37L. As upper anchor block 37U swings into place around and above hinge pin 39, legs 35L and 35R spread into operating stance. Simultaneously, all within a single easy 180-degree arc of arm movement, upper spine rails 38L and 38R, which had been folded down nearly parallel to lower spine rails 34L and 34R, now align as a near straight-line extension. FIG. 12 shows this unfolding partly completed.

Shopper then removes the nested basket pair from car trunk. She mounts the two as a nested unit if her shopping likely will fill only one. Mounting is done by seating basket or nest on folding ledge, then sliding the lock down to retain.

The second basket can be deployed later if needed. At the checkout counter she positions the cart close, releases the sliding lock on the heavier-loaded upper basket or nest, then eases the weight down without lifting, levering basket bottom down from cart ledge to counter top. Checkout clerks may choose to help with partial unloading of baskets, using portable scanner guns to read bar codes on items remaining in baskets, and reloading baskets at their convenient counter level.

Next the shopper levers the heaviest basket back up from counter to upper cart ledge, then closes its retaining lock. Finally, she lifts the lightest basket down to the lower level and closes that retaining slide.

Figure 3:
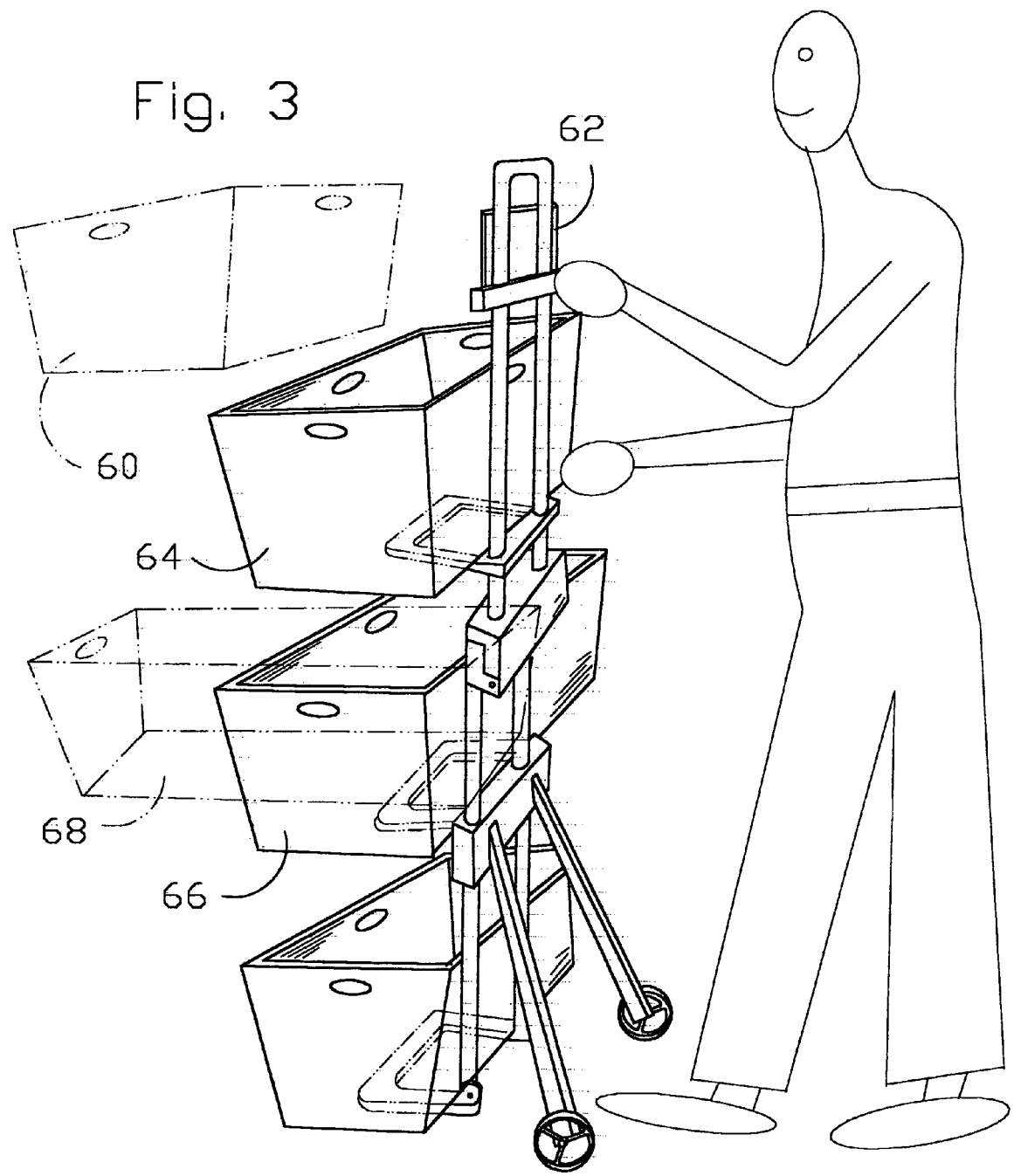
FIG. 3 is a perspective view of a more vertically oriented shopping cart which can carry four baskets.

Alternative basket placements may be made at any point in these processes. For example, one or both baskets may be mounted to the spine by a basket's end, rather than its side, as shown in FIG. 3.

Moving through the parking lot more easily than with a heavy store cart, the shopper now reaches her car, opens the trunk, and eases the lower basket across from cart ledge to trunk sill to trunk floor. Then she brings the cart closer, with upper basket projecting above trunk sill, releasing that heavier-loaded basket and sliding it down into the trunk, avoiding lifting the full weight.

With shopping, checkout and car-loading work done, the shopper heads where store carts never go—home, for the last two laps: unloading car and delivering to kitchen. She reopens the cart frame, parks it close to car's open trunk, slides heaviest basket to trunk sill and levers basket to upper cart shelf, locks it, lifts second basket to lower shelf, and closes its retainer. In the kitchen, she removes the light bottom basket first, then levers top basket down to kitchen table without lifting. In each lap of her journey from store to kitchen, her work is easier because our cart eases movements, and simplifies handling of merchandise.

FIG. 2—ADDITIONAL EMBODIMENTS

Figure 2:
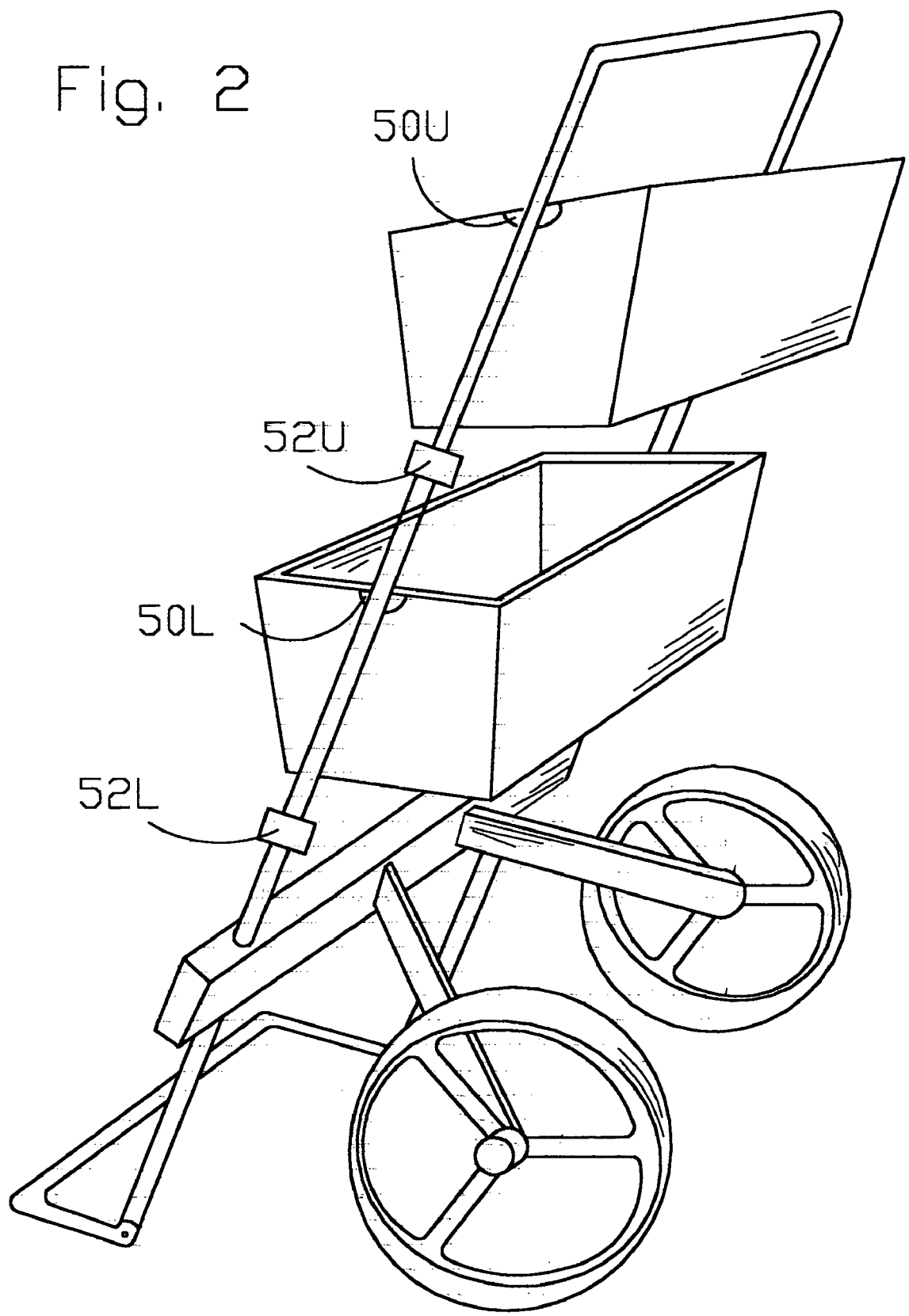
FIG. 2 is a perspective view of a wide-frame version of my shopping cart.

The wide-frame, wide-handle embodiment shown in FIG. 2 differs from the preferred embodiment in two additional ways. First, the baskets are supported on pairs of quick-release pins, one at each basket end. Two pin mounts are indicated at 50U and 50L. They let baskets respond like ferris-wheel seats, leveling by gravity as their support shifts. Second, the frame extends and contracts by telescoping, with only the legs and toe loop folding. Two of the telescope locks, 52U and 52L, are sketched on the-frame's left side:

A somewhat taller embodiment, shown in FIG. 3, has four baskets, one above another. The spine angle comes closer to vertical, with shallower baskets, or baskets of varying depths. This embodiment might be preferred by parents, because a baby cradled in the top basket or second from top would be carried near the parent's face rather than near the floor as in conventional baby carriers. Small children seated in a basket would be provided the usual basket leg holes, and a seating cushion more comfortable than supermarket steel gratings. Here the father has removed top tower basket 60 for best access to baby in second basket 64. He may turn third basket 66 to lock in alternate position 68. Support platform 62 has been folded to spine for convenience.

Figure 4:
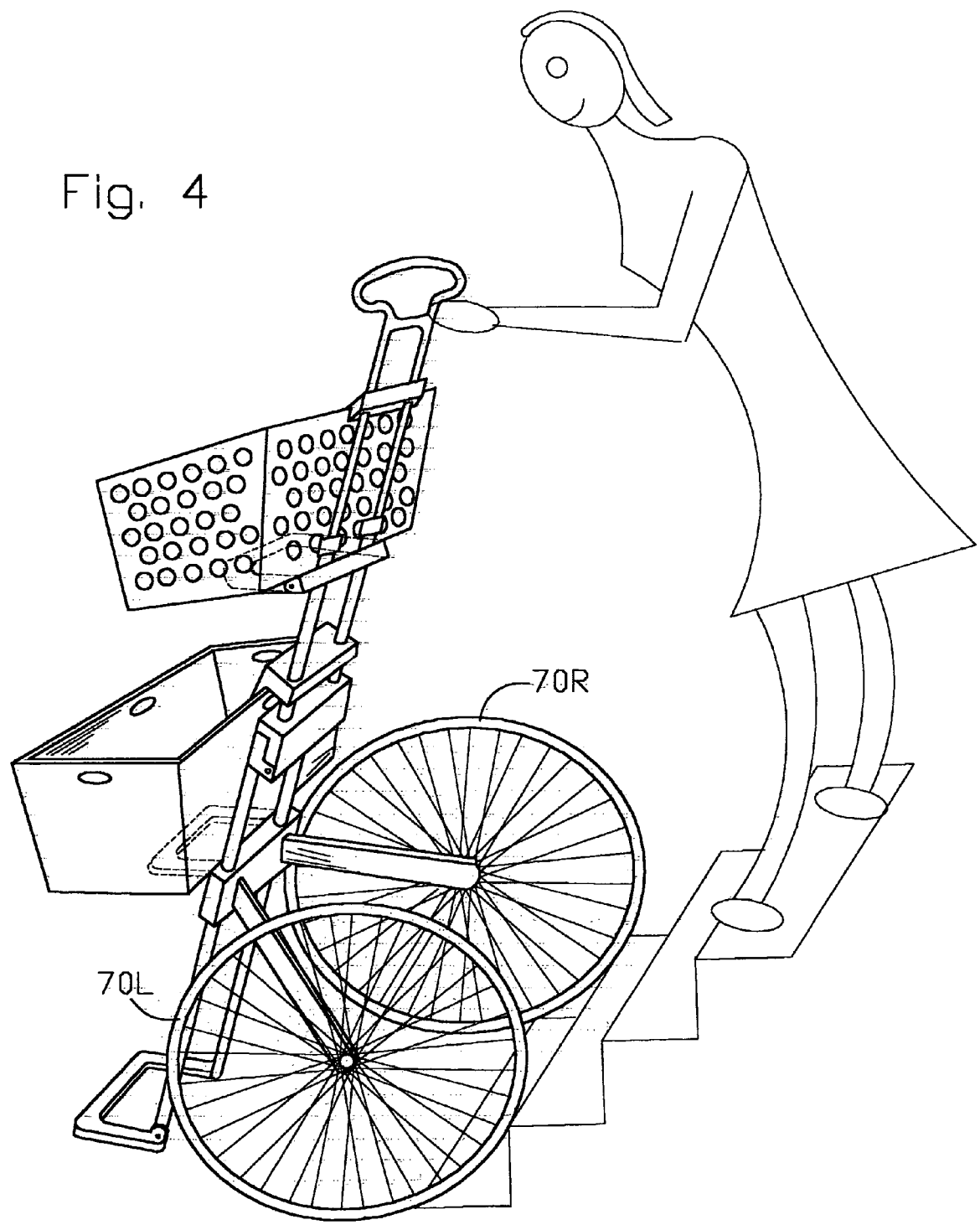
FIG. 4 is a perspective view of a stair-climbing bicycle-wheel cart.

Stairs are best climbed by bicycle wheels 70L and 70R, shown in FIG. 4, because their large diameter bridges stair tread spans more smoothly. Quick-release mounts (not shown because well-known in the art) are especially important for larger wheels.

Figure 5:
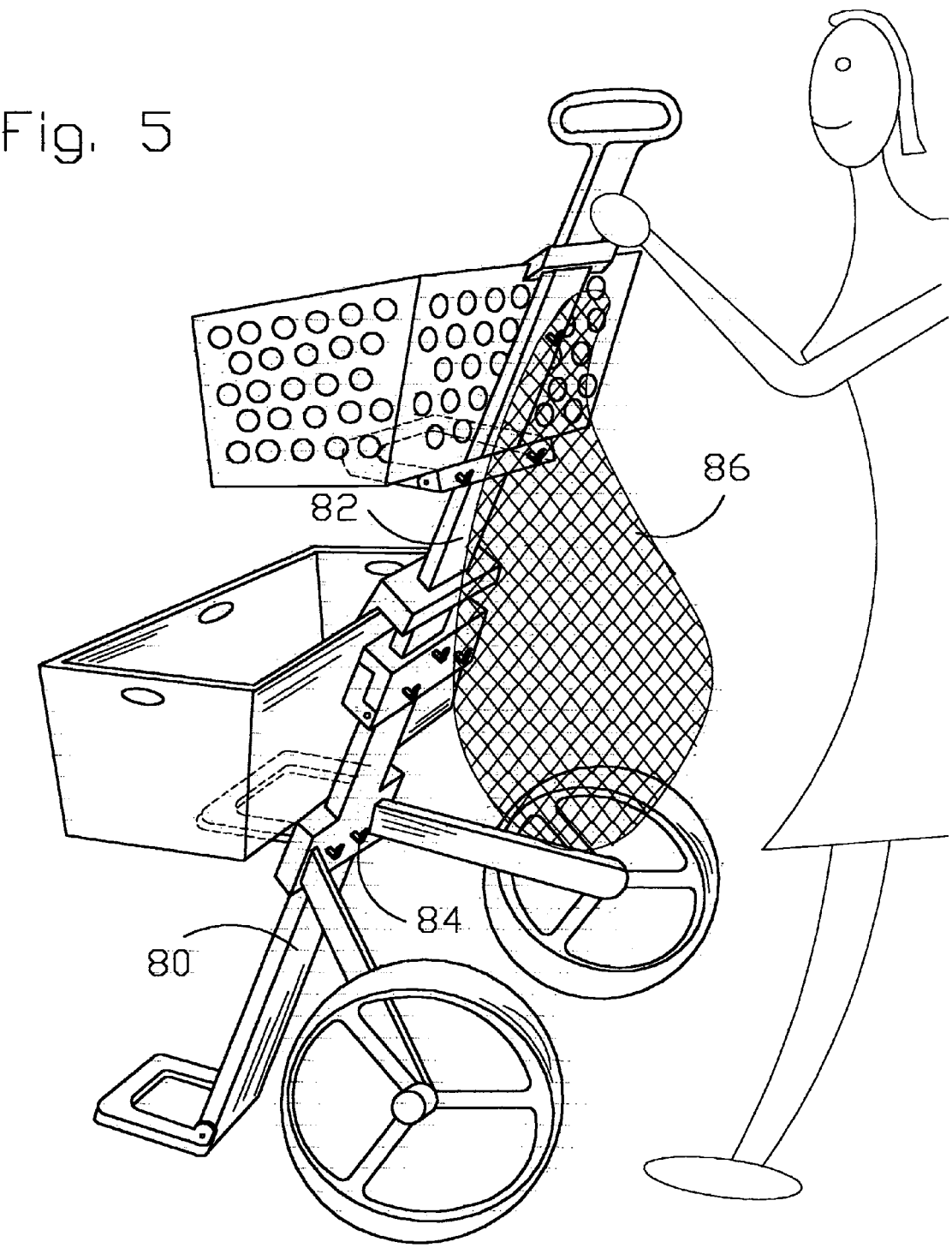
FIG. 5 is a perspective view of a shopping cart with a single central spine.

A single-spine cart is shown in FIG. 5, with solid lower spine 80 and solid upper spine 82. Hooks such as anchor hook 84 are set at several locations to hold such items as net bag 86. Securing straps, elastic shock cord and the like, omitted here for clarity and simplicity, hold such a supplemental carrier compactly until it is deployed to hold bulky, lightweight, fragile items. Small hooks, rings, clips, and other small anchoring devices may be added to improve all of our cart embodiments.

Figure 6:
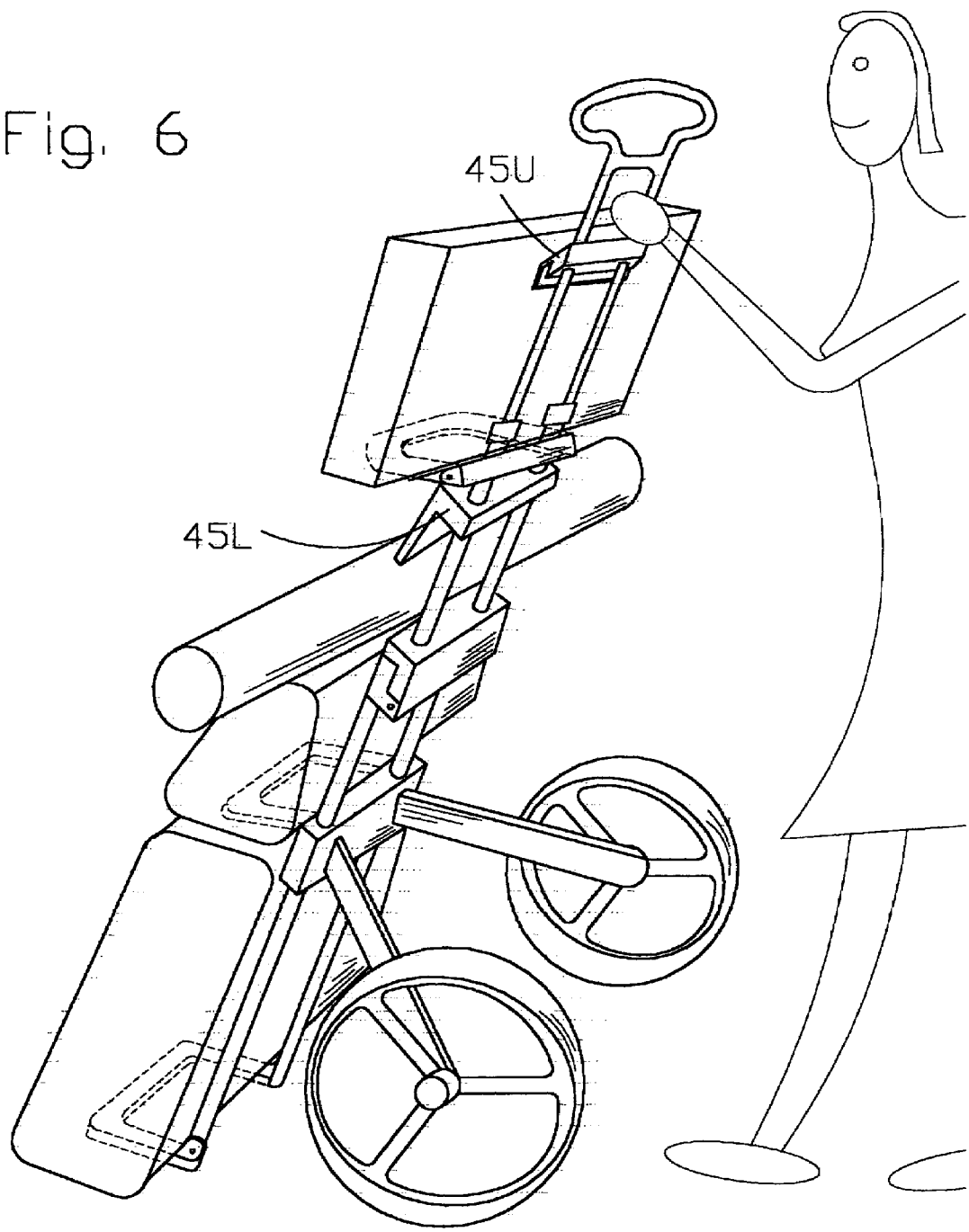
FIG. 6 is a perspective view of my preferred embodiment shopping cart, with baskets removed, now in use as a luggage carrier.

In FIG. 6 our preferred embodiment cart, with its baskets removed, serves as a luggage carrier. Lower sliding lock 45L has been raised to provide clearance for bulky items. Upper sliding lock 45U has been simply ignored, with the case standing ahead of it. Securing straps, elastic shock cord and the like have been omitted again.

Figure 7:
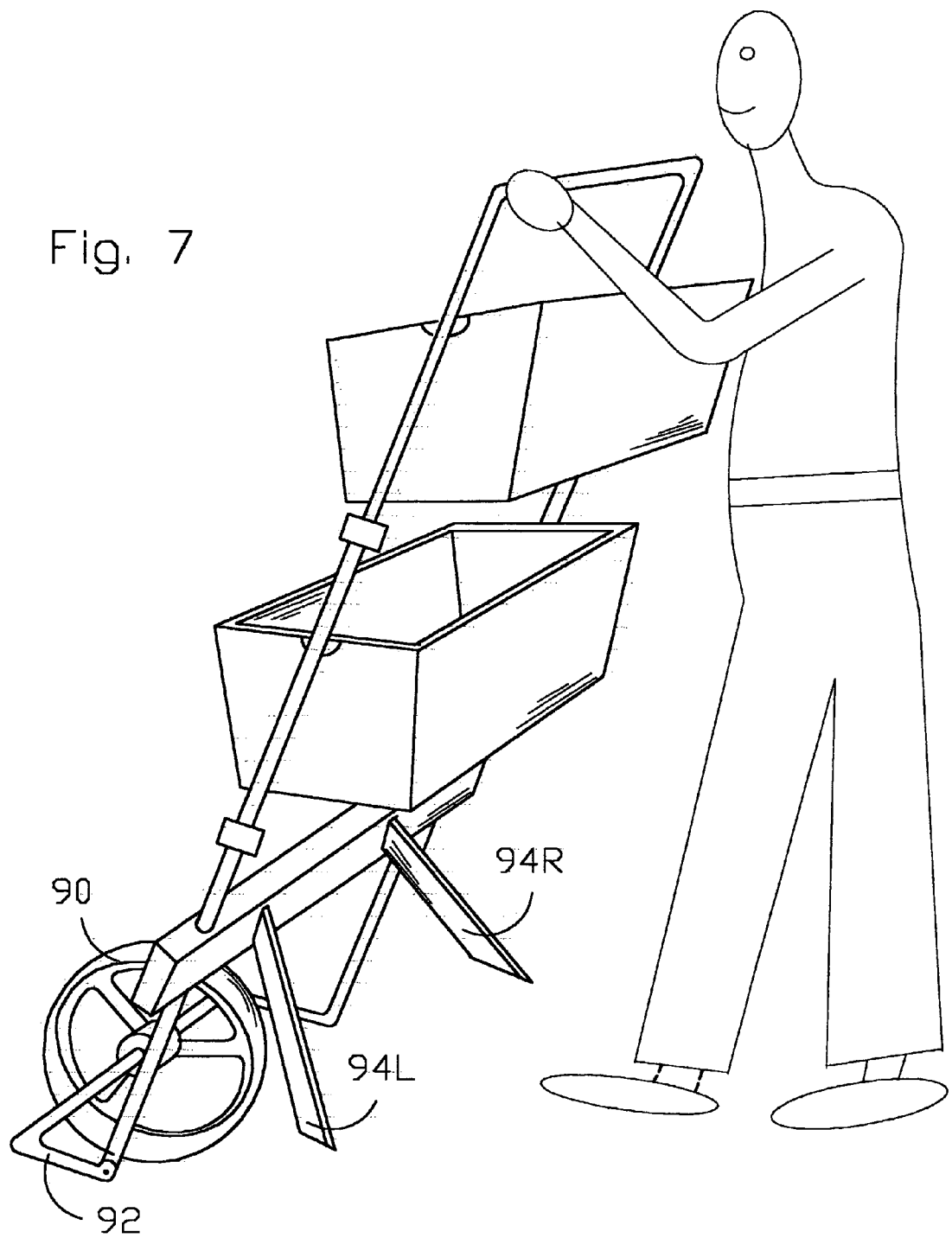
FIG. 7 is a perspective view of a single-wheel shopping cart.

FIG. 7 shows a single wheel cart, with its wheel 90 centered on locking axle-brace 92. Outrigger struts 94L and 94R balance the cart when parked.

Figure 8:
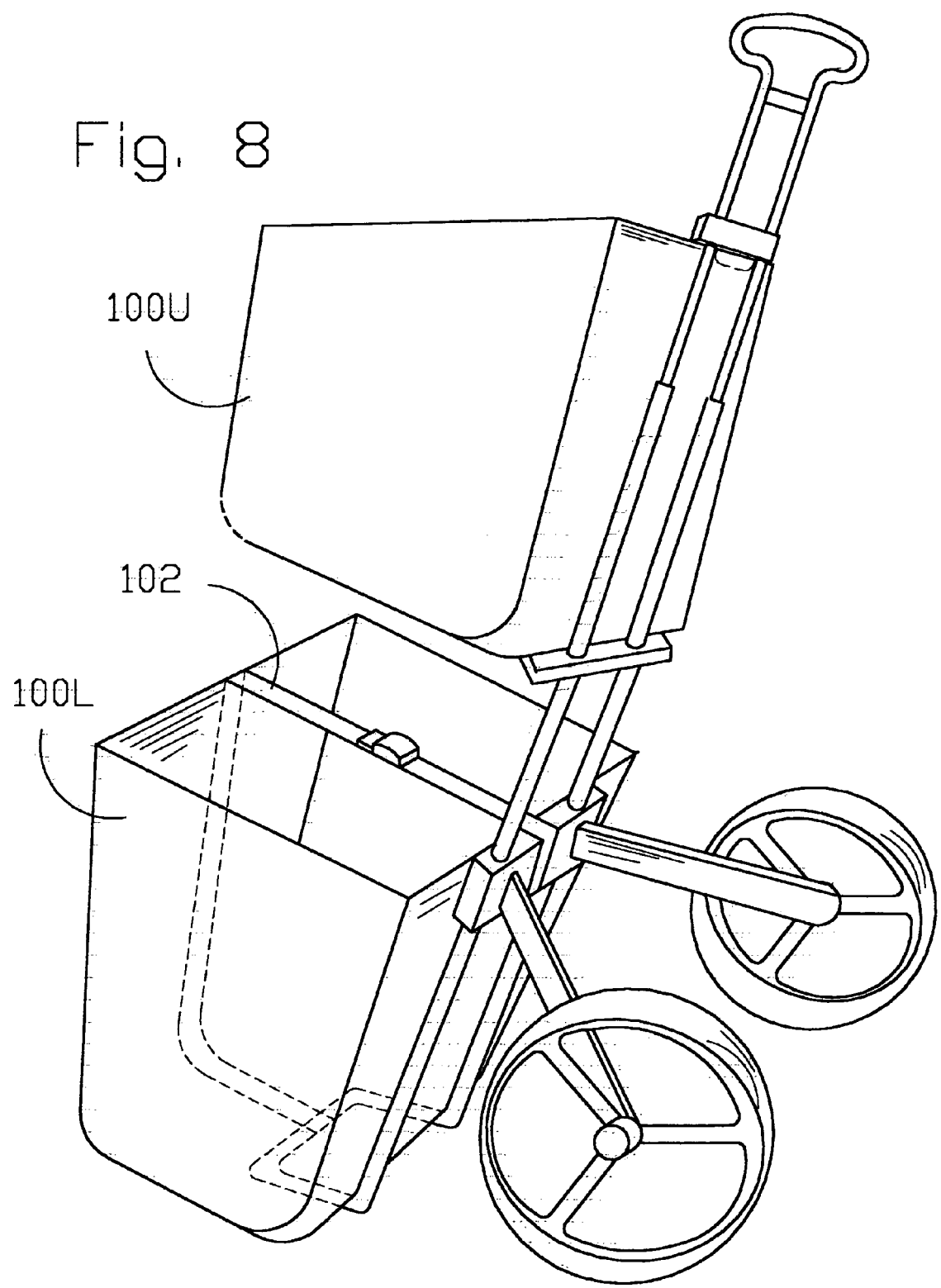
FIG. 8 is a perspective view of a deep-basket shopping cart.

Maximum cargo capacity is possible with the cart of FIG. 8. Its deep tubs 100U and 100L are secured to the cart by quick-release web belts of the automobile seat-belt type, such as belt 102.

Figure 9:
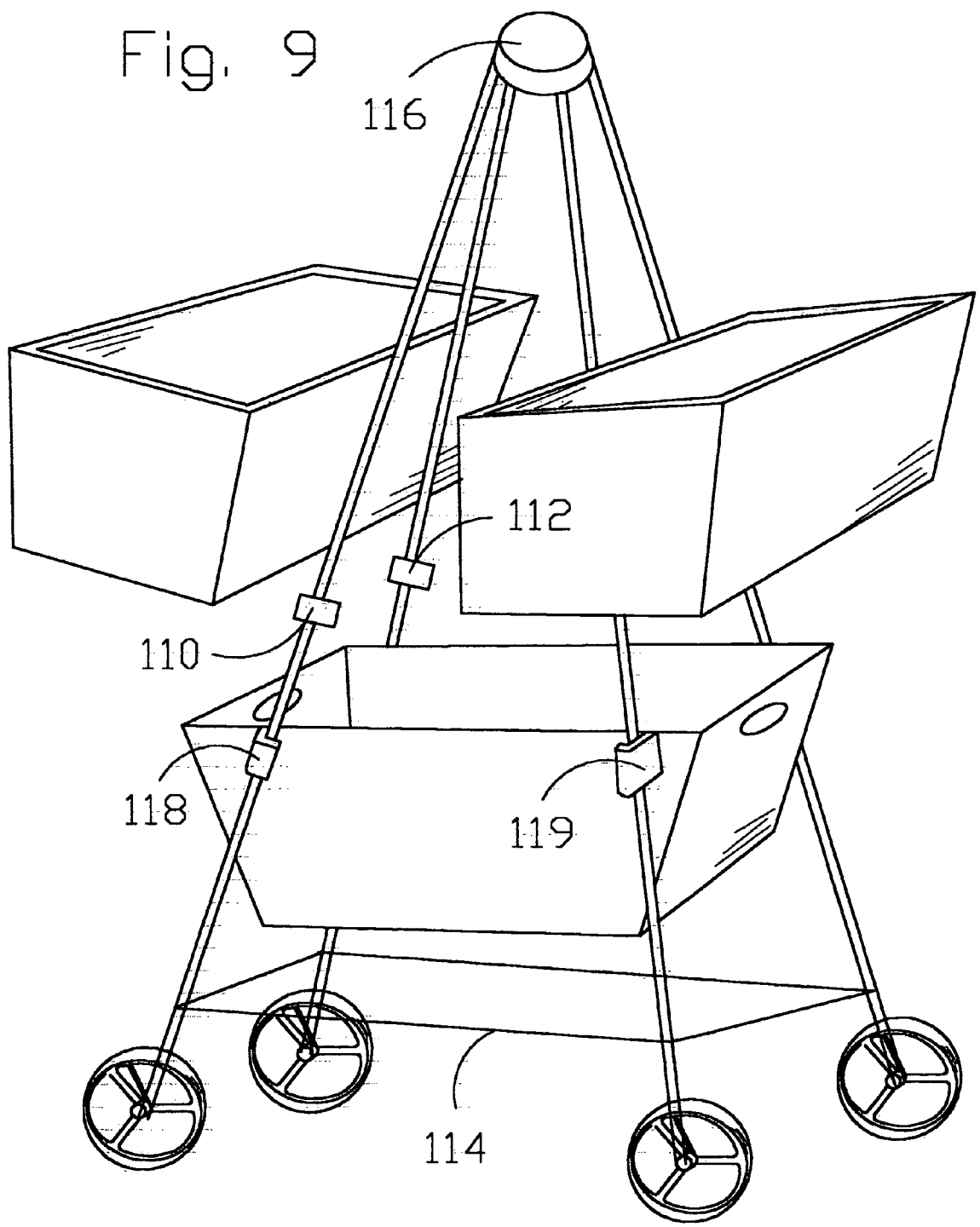
FIG. 9 is a perspective view of a four-wheel pyramid shopping cart.

The four-wheel pyramid-frame cart of FIG. 9 uses a telescoping spine member for each wheel, with telescope locks visible at 110 and 112. Flexible cable 114 sets spine positions when spine members fold open at pyramid cap 116. Basket mounts could include rows of hooks on the upper telescope sections, such as those of FIG. 5, with the hooks engaging openings in the basket, such as the circular perforations shown in basket 44U of FIG. 1.. The lower basket could engage lower telescope poles with pairs of slanting slotted blocks projecting from the basket wall, such as left block 118 and right block 119.

Figure 10:
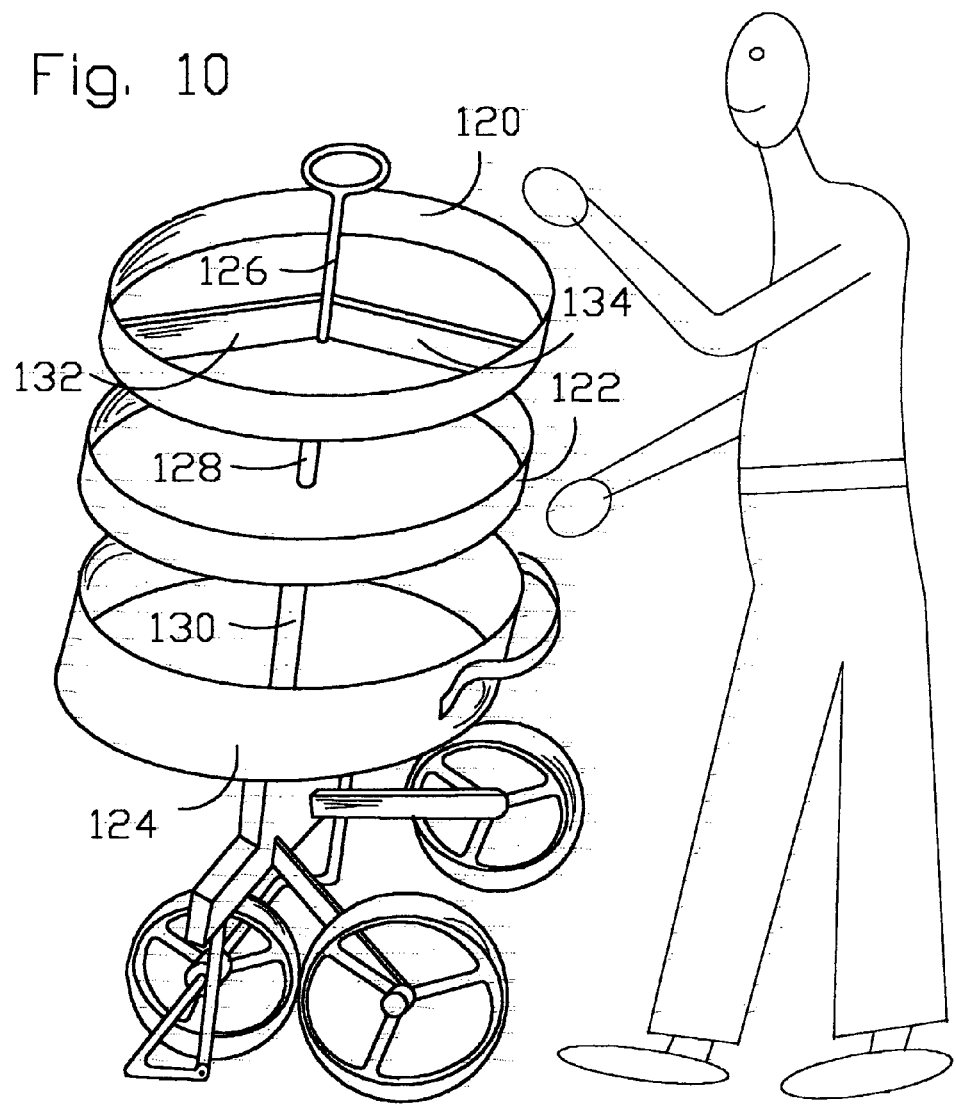
FIG. 10 is a perspective view of a lazy susan segmented-spine cart.

FIG. 10 shows a lazy susan arrangement of rotating baskets: top circular tray 120, middle circular tray 122 and bottom circular tray 124. Upper spine segment 126 is attached to tray 120, so the two may be removed together. Segment 126 extends below basket, fitting inside hollow middle spine segment 128. Similarly, segment 128 is attached to tray 122 and fits into lower hollow spine segment 130. Partitions similar to left partition 132 and right partition 134 may be used to organize other baskets.

Figure 11:
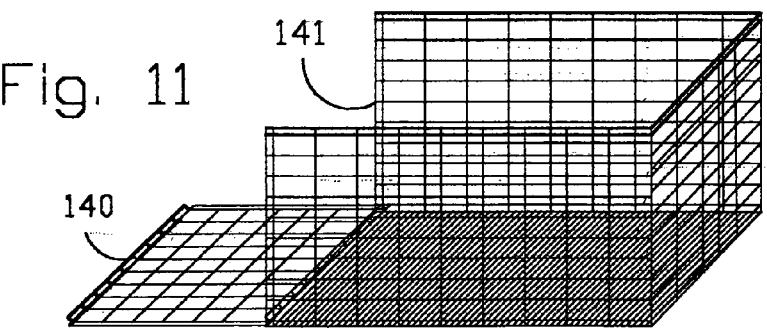
FIG. 11 is a perspective view of a wire-frame shopping basket with hinged end panel.

A wire basket usable on most of our embodiments is shown in FIG. 11. Hinged left end panel 140 opens to ease basket-loading and unloading. Rear panel 141 could be similarly hinged. For maximum convenience in unloading, side and end panels could by united in a rigid box, with bottom detachable by quick-release clips. Panel locks and hinges are not shown, being well known in the art.

FIG. 12 shows our preferred-embodiment-cart with its baskets removed, with its spine and wheels about half-folded toward their closed positions.

Figure 13:
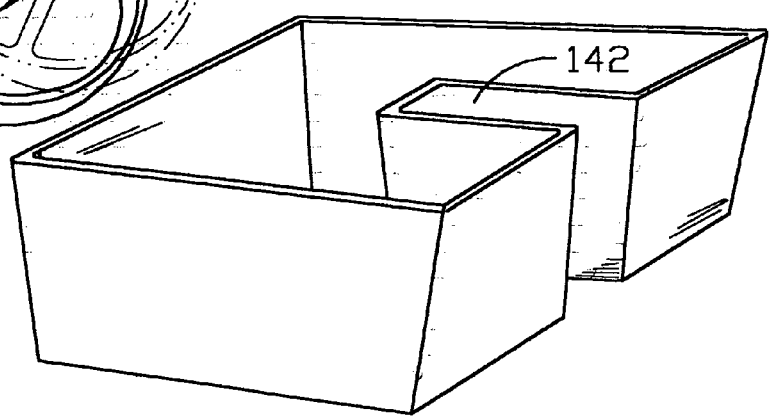
FIG. 13 is a perspective view of a frame-straddling shopping basket.

The basket of FIG. 13, usable with the preferred embodiment and other narrow-spine carts, has a deep notch inset, slot, or pocket 142. The basket is mounted by sliding it backward (to the right in this drawing) until the cart spine reaches the extreme end of the pocket. In that position, the basket allows heavy merchandise carried in the basket sectors to left and right of the pocket to partly counterbalance items in the wide forward basket sector. The counterbalancing function makes these baskets easier to mount on the cart and release from it. Taking advantage of the natural flexibility of thin-walled plastic baskets, a further level of retention could be added to this basket: vertical grooves formed at the corners of the pocket's inner end could snap around and hold the two spine tubes.

FIG. 14 shows an elevator cart with an endless belt 150, moved by folding crank 152, passing over hidden rollers inside upper roller enclosure 154 and lower roller enclosure 156. Slots in the belt engage projections centered on the rear upper edges of baskets. Thus a heavily-loaded basket may be attached to the belt just above lower enclosure 156, then cranked up until its attaching point reaches upper enclosure 154. After removal of the lower basket, this cart allows crank-down of the heavy upper basket to exactly the right height for release at each stop in the shopping journey: checkout counter, car trunk sill, and kitchen counter or table. Details of the mechanical operation are not shown, being considered well-known in the arts of continuous belts and cranking devices. A bicycle chain, for example, could be used to link and drive the two belt rollers.

FIG. 15 shows an example of our cart with the spine-folding fixtures removed, leaving it with a fixed-length spine making nearly a straight line from the handle above to the heel of the folding toe loop resting on the ground.

Frame materials could include light-metal alloy tubing, polyethylene, polypropylene, vinyl, nylon, and various impregnated or laminated fibrous materials such as graphite fibers. Wheels could use similar materials, plus rubber tires and bicycle-spoke construction as in FIG. 4. Basket materials could include not only all of the suggested frame materials, but also wicker, canvas, light metal alloy panels, and woven webbing. Basket shapes might vary from rectangular to square to shallow to deep to semicircular, circular or irregular shapes, with panels perforated, flat, or formed. Devices for quick-connect and quick-release retention of containers could include, beyond those shown in our drawings, spring-loaded clips, clamps, permanent magnets, molded shapes tailored to fit basket indentations and projections, and loops of leather or other flexible materials fitting over hooks or pins.

One or more amorphous bags of netting, plastic or cloth could be compactly strapped to a frame element. Deployed for bulky lightweight items such as potato chip bags or cut flowers, such bags can be conveniently hooked for carriage behind the spine and beneath baskets.

Theory of Operation

Working models of our preferred embodiment, and some of the other embodiments mentioned here, were created by adapting common golf carts. We stripped away the devices specific to golf: bag spacer cradles, securing belts, scorecard desk plate, drink-bottle socket, and ball holders. This left strong, lightweight, folding spines on wheels. We enlarged the wheels, to improve maneuverability and also to elevate spine angles closer to vertical, bringing the centers of gravity of spine burdens closer to the vertical plane through the wheels' virtual axle (line through wheel hubs). Adding baskets, their folding ledges, and locks, we completed our preferred and other shopping carts. Tests proved them serviceable for multiple purposes in store, parking lot and home.

Then we found unexpected options. With shopping baskets removed and ledges folded, there was no barrier against returning the carts to golf bag carrier service. Such frills as scorecard desk were lost, but the basic function of bag carriage was unimpeded. A securing length or two of webbing belt or shock cord secured bags again for golf Then, with golf bag removed, our next surprise: the same cord and belts secured our luggage to the cart skeleton at the airport. We moved our gear through airport security, caught connecting flights, and passed through customs far more conveniently than is possible with the usual carts available to air travelers.

We are still finding new uses for our simplest skeleton cart. It serves as hand truck, helping to move household burdens once carried on a shoulder or jockeyed into a wheelbarrow. It's a garden cart. It moves furniture and appliances up to and including a medium-size refrigerator. With extra fittings, it could serve as a light wheelbarrow or as a mail carrier's bag cart. Basic theory: though designed for long-distance transit of 20-pound bags of golf clubs across often rough and steep terrain, these carts easily carry 50- to 100-pound loads on shorter trips across comparatively smooth surfaces.

Conclusion, Ramifications, and Scope

Strip an ordinary golf bag push cart of its fixtures for holding the bag. What remains is a strong, lightweight hand truck. It holds for compact storage in car trunk, garage, home, or yard. Fit it with quick-detach baskets, and you have a shopping cart easier to maneuver in stores and parking lots than the usual 50-pound steel knee-level supermarket basket on tiny wheels.

The basic cart is readily adaptable to special needs. For the shopper who must climb or descend stairs to deliver groceries from garage to kitchen, full-size adult bicycle wheels on quick-attach mounts transform this cart to a stair-climber. Interchangeable spare wheel sets give this shopper the option of more compact wheels for store, car, and parking lot, reserving bicycle wheels for home use.

To carry your luggage through an airport, all you need are lengths of webbing belt or shock cord to quickly secure bags, briefcase, laptop computer and related items to the cart. Heavy bags of fertilizer, seed, soil and other garden materials are easily picked up and moved. Beyond grocery supermarkets, various large modern stores and malls provide inferior carts. This cart works better in all those places: hardware, drug, department, and discount stores. Warehouse stores, with their broad expanses and maximum-size customer carts, are ideal sites for my cart styles.

Our preferred embodiment can anchor a line of accessories for sale to cart owners as need arises. A baby's cradle, for example, could later be replaced by a child seat. Tool trays and racks fitting our spine may be offered to the plumber, electrician, oil-burner mechanic, road-service auto repairman and other craftsmen whose day's work may require tool transfers into and out of several sites. Bags and sorting trays will serve mail deliverers. Drug-compartment and instrument trays can aid hospital staff.

In conclusion, my carts and their various attachments, built on time-tested golf cart structures, will carry heavier loads for more different kinds of people, meeting their everyday necessities in stores, homes, and workplaces.

Although the descriptions offered above contain many specifics, our meager offering of drawings and suggestions is not intended to restrict the wide array of possibilities offered by the load-bearing vehicles we have identified. Our examples should be taken merely as illustrating a few embodiments of this invention. May other variations are possible beyond those presented here.

Thus the scope of my invention should be determined by the appended claims and their legal equivalents, rather than by the examples offered.

I claim:

1. A tall shopping cart, comprising:
   A. a plurality of merchandise containers, and
   B. a tall dual-rail spine divided into upper and lower segments, each segment containing parallel left and right rails, said segments connected by a locking hinge, to enable folding for compact stowage after removal of containers, and
   C. a plurality of ledges affixed to the cart, each ledge positioned upon the cart to sandwich a container between a ledge and a lock, the lower of said ledges affixed to the cart at a substantial predetermined height, and
   D. a plurality of quick-attach and quick-detach locks, each lock a slidably mounted block bridging the distance across the spine's dual rails, enclosing each rail, and sliding along those rails, each block fitted with a projection positioned to sandwich a container wall between said projection and said tall spine, enabling a small woman to easily lock loaded baskets by sliding the lock straight down the cart's dual spine, and releasing equally easily by sliding the lock back up, and
   E. a plurality of wheels, each attached to the tall spine by a leg.

2. The shopping cart of claim 1 wherein the cart is selected from the group consisting of carts using frame materials of light-metal alloy tubing and polyethylene and polypropylene and vinyl and nylon and impregnated fibrous materials and laminated fibrous materials.

3. The cart of claim 1 wherein said merchandise containers are selected from the group consisting of perforated plastic baskets, solid plastic tubs, wire baskets, hinged-end baskets, circular trays, and baskets with a deep walled slot set into a wall.

4. The cart of claim 1 further including wheels selected from the group consisting of wheels mounted upon quick-release hub connectors and wheels mounted upon folding struts and large wheels.

* * * * *